United States Patent
Garin et al.

[11] Patent Number: 5,961,245
[45] Date of Patent: Oct. 5, 1999

[54] UPPER PART OF COLUMN

[75] Inventors: Gilles Garin, Strasbourg; Henri Ullius, Schwindratzheim, both of France; Gerd Rudolph, Aspisheim, Germany

[73] Assignee: Eaton Corporation, Cleveland, Ohio

[21] Appl. No.: 08/919,955

[22] Filed: Aug. 29, 1997

[51] Int. Cl.⁶ ................................................. F16B 2/18
[52] U.S. Cl. .............................. 403/322.1; 403/374.4; 403/409.1; 280/779
[58] Field of Search .................. 403/321, 322.1, 403/322.3, 323, 13, 364, 338, 409.1, 374.1, 374.2, 374.3, 374.4, 374.5; 285/320, 308; 74/492; 280/779

[56] References Cited

U.S. PATENT DOCUMENTS

| | | | |
|---|---|---|---|
| 265,747 | 10/1882 | Briggs | 403/374.5 |
| 2,409,650 | 10/1946 | Wiggins | 285/320 X |
| 2,942,903 | 6/1960 | Giladett | 403/321 X |
| 3,195,934 | 7/1965 | Parrish | 403/374.5 X |
| 3,445,133 | 5/1969 | Reischl | 403/321 X |
| 3,703,741 | 11/1972 | Foster et al. | 403/364 X |
| 3,870,345 | 3/1975 | Liautaud | 285/320 X |
| 4,433,496 | 2/1984 | Jones et al. | 403/374.3 X |
| 4,514,708 | 4/1985 | Ludtke | 403/321 X |
| 4,601,182 | 7/1986 | Glanzmann | 403/13 X |
| 5,042,850 | 8/1991 | Culler | 285/320 |

FOREIGN PATENT DOCUMENTS

| | | | |
|---|---|---|---|
| 2041 | of 1891 | United Kingdom | 403/321 |
| 6141 | 3/1893 | United Kingdom | 285/320 |

*Primary Examiner*—Harry C. Kim
*Attorney, Agent, or Firm*—Roger A. Johnston

[57] ABSTRACT

A system for axially locking the end of a shaft in a sleeve whereby the shaft fits axially into the sleeve until both parts are fully engaged, in which both parts are locked together. Axial locking is achieved by a latch disposed on the outside of the sleeve and which pivots into a slot made in a wall of the sleeve, such that the latch can be inserted in an orifice of the shaft positioned opposite the slot when the shaft is fully engaged in the sleeve.

7 Claims, 3 Drawing Sheets

UPPER PART OF COLUMN

BACKGROUND OF THE INVENTION

The present invention concerns a system for axially locking the end of a long component such as a shaft or column in a host component such as a sleeve. The lock becomes effective when the shaft component fits axially and is fully engaged in the second component.

To assist the reader, reference will be made below to the preferred application of the invention, which is the automotive equipment industry.

More specifically, this type of axial locking problem is encountered for example when a steering column is fitted to a switch bracket arranged between the column and the steering wheel. In this type of application, the problems requiring a solution can be simply defined:

It must be possible to assemble and dismantle these parts easily, preferably using a single tool, or even without a tool;

When these components are secured to each other, the lock must be positive, preventing all possible relative movements and conserving its mechanical characteristics for the longest possible duration.

In connection with the above example these requirements can be described in a less generic fashion, namely the fitting of a switch bracket to the upper part of a column and their axial and rotational locking, preferably by means of an adjustable device, if one is used, accessible on the front of the switch bracket, ie facing the steering wheel.

Locking may also be obtained automatically, ie without any adjustable devices, notably by means of a device using a return force, according to a method widely employed.

Systems for fitting steering columns to switch brackets already exist using reliefs located at the ends of the columns, enabling the latter to be clipped into slots provided for this purpose in the switch brackets. The method used is based on the elasticity of the materials, and therefore on a spring effect applied to the contact areas, which are deformed and then return to their original positions as soon as they are able to do so, ie when they are opposite the slots.

However, in a locking system as outlined above the lock must not only be effective after assembly, but also easy to dismantle.

The existing systems referred to above are not easy to dismantle, since the steering column clips into the switch bracket peripherally, generally presenting a rotational symmetry. It can therefore only be dismantled simultaneously around the entire periphery, which can prove to be a delicate operation and/or one requiring a special tool.

Generally, in configurations such as these, axial locking is also obtained by means which at the same time ensure rotational locking, as is the case in the existing solution referred to above, hence the difficulties in terms of dismantling.

BRIEF SUMMARY OF THE INVENTION

The system according to the invention overcomes these drawbacks by precisely outlining an independent axial locking system, the shape and positioning of which have been designed to facilitate or automate the assembly of a steering column in a switch bracket.

Another object of the invention is to facilitate the disassembly of both parts.

An additional object is to improve access to mechanical control systems, allowing locking and unlocking.

A further object of the invention is to provide a guiding function during assembly, allowing a quick and safe fit between both parts.

Lastly, the system according to the invention guarantees the soundness of mechanical connections over time, thus achieving enhanced safety.

Although these advantages are described within the scope of the above-mentioned preferred application, the system according to the invention applies more generally to all mechanical connections where shafts are secured axially in joining pieces such as end sleeves.

The aforesaid axial locking is obtained by means of a latch located on the outside of the sleeve, which pivots in front of a slot made in a wall of the sleeve, such that it can be inserted in an orifice of the shaft appearing opposite the slot when the shaft is fully engaged in the sleeve.

The existence of the two slots facing one another requires special relative positioning of the parts during assembly. Preferably, these parts have an axial guiding system, enabling the shaft orifice to be positioned opposite the slot in the sleeve when the shaft is fully engaged in the sleeve. This system offers the unique feature of driving the shaft into the sleeve.

According to one embodiment, this axial guiding system consists of a lug placed on the shaft which slides in an axial groove on the inside of the sleeve, the lug and the groove being positioned such that the slot and the orifice are facing each other.

When both openings are positioned opposite one another, the latch is able to pivot and thus insert itself in the shaft orifice, thereby securing it in the locked position. However, the latch cooperates with a locked-position holding device located on the sleeve, one part of the latch then being held in the shaft orifice to prevent it from moving.

According to one configuration, the holding device comprises a screw which, when tightened, exerts a force on the latch causing it to lock in position inside the shaft orifice.

A more automated variation, at least where assembly is concerned, is also possible. In this case the holding device comprises a rod fitted with a spring bringing the end of the rod back in contact with the latch, such that the force exerted by the end brings the latch to a locked position inside the shaft orifice.

In both cases, the said force is parallel to the shaft axis and is exerted in the direction of the sleeve opening.

In the variant with the return rod, contact between the end of the rod and the latch is constant, and therefore that portion of the latch situated near the area in contact with the end of the return rod must be equipped with a cam allowing displacement of the end when the latch is freed from its locked position in the shaft orifice. At this time there is a relative displacement of the contact surfaces which cannot be inhibited.

The system according to the invention applies of course to several types of shapes and volumes, however according to the commonest configuration, the sleeve and the shaft are cylindrical, being rotational symmetrical at least in their contact areas.

In this case, both parts of the mechanical connection are in addition fitted with a rotational locking system consisting of trapezoid crenellations on the end of the shaft which fit into corresponding reliefs protruding from the inside of the sleeve.

A configuration such as this with cylindrical parts and two locking systems, both axial and rotational, applies typically to the above-mentioned preferred application of the system according to the invention: the sleeve is incorporated in a switch bracket arranged between a control device such as an automobile steering wheel and a steering column constituting the above-mentioned shaft.

In the variant with a locking screw, the requirements for ease of assembly/disassembly require the head of the screw to be accessible on the section of the switch bracket facing the steering wheel.

A means of control such as this does not appear in the return rod variant: assembly is an automatic clip-on operation, since the latch is returned to its locking position by the return force of the spring exerted on the latch via the end of the rod around which the spring is wound.

In this case the latch has an area intended to cooperate with a tool exerting a force tending to extract it from the steering column orifice during dismantling.

This surface needs simply to be oriented such that a tool, for example a screwdriver, is able to exert a force opposing the return force in order to pivot the latch out of the column orifice, thereby unlocking the column.

Generally, for both of the above-mentioned variants, the periphery of the latch has at least three distinct areas:

a cam area on the surface in contact with the locked-position holding device;

a shoulder area with one surface parallel to a portion of the preceding area, but located on the other side of the swivel pin, this parallel surface being designed to make contact with the side of the column orifice nearest the end of the column; and an area with a surface enabling the dismantling tool to exert a force causing the latch to pivot in the opposite direction to that exerted by the return force.

On the switch bracket, the latch is located on the outer cylindrical wall of the sleeve, the swivel pin being perpendicular to the shaft axis.

BRIEF DESCRIPTION OF THE DRAWINGS

The invention will now be described in more detail, with reference to the enclosed figures, in which.

DETAILED DESCRIPTION OF THE INVENTION

Figure 1:
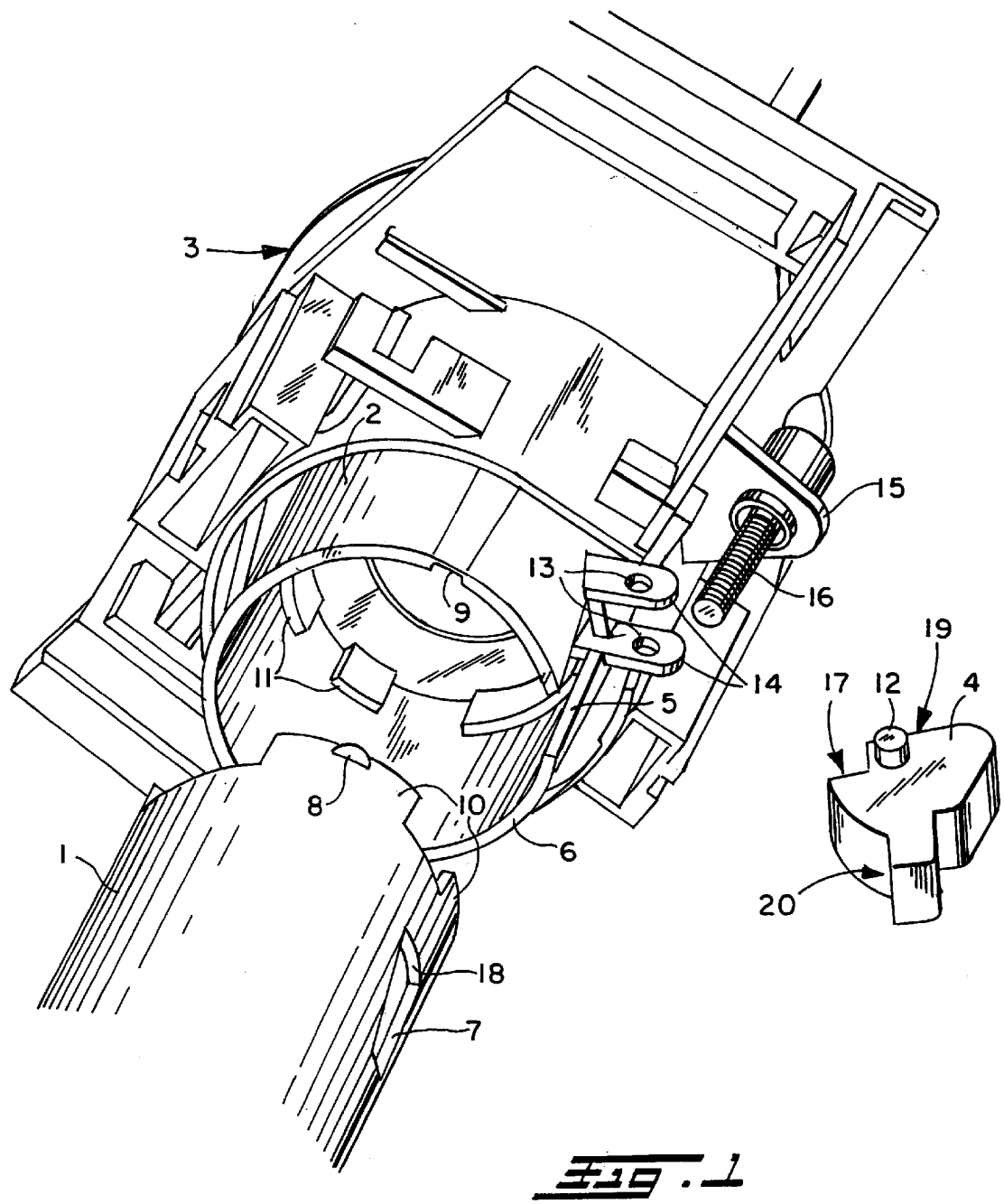
FIG. 1 is an exploded perspective view of the basic components of the invention, for the first configuration.

With reference firstly to FIG. 1, the steering column 1 is shown removed from its position in the sleeve 2 mounted on the switch bracket 3, which will not be described in detail since it is not part of the invention as such.

The latch 4 is designed to pivot opposite the slot 5 made in the cylindrical wall 6 of the sleeve 2. This slot 5 must be positioned opposite the rectangular orifice 7 made in the column 1, which will adopt the correct relative rotational position due to the existence of the lug 8 which, during assembly, slides in the groove 9, thus permitting only one relative position of the two parts 1, 2 and the correct orientation of orifice 7.

The end of the column 1 has crenellations or castellations 10 intended to cooperate with corresponding reliefs 11 arranged on the inner cylindrical wall of the sleeve 2. The shape of these crenellations 10 and reliefs 11 is slightly trapezoid in order to facilitate insertion whilst still ensuring complete rotational locking. This shape also enables the reliefs 11 to serve as an axial abutment.

The latch 4 has a shaft portion or trunnion 12 protruding on both sides, intended to cooperate with orifices 13 made in the wings or projections 14 directly attached to the cylindrical wall 6 of the sleeve 2. The latch 4 pivots precisely opposite or aligned with the two slots 5, 7 made in the cylindrical walls of the connected parts 1, 2.

Above the wings 14, a bracket 15 acts as a support for the holding device 16 which keeps the latch 4 in the locked position, the two proposed variants of which will be described below.

The system operates as follows: in order to secure the steering column 1 in the sleeve 2 mounted on the switch bracket 3, it is necessary to insert the crenelated end of the column such that the lug 8 can slide in the groove 9.

When the parts are abutting, i.e., when the trapezoid crenellations 10 are locked by the reversed trapezoids forming the reliefs 11 of the sleeve 2, the latch 4 may be pivoted into the window 7 of the steering column 1 thus locking the latter to the switch bracket 3.

This locking occurs when the shoulder 17 is in contact with the side 18 of the orifice 7. In this case, the axial force exerted against the flat surface 19 of latch 4, in the direction of the opening of the sleeve 2, by the device 16, is converted into a force with the same alignment but in the opposite direction applied by the shoulder 17 of latch 4 to the side 18 of the orifice 7, preventing any axial movement of the steering column 1. The force couple is exerted on either side of the shaft 12.

The area 20 of the latch 4 may lastly be used to act against the return force, if any, enabling the latch 4 to be pivoted in the opposite direction to the locking direction to unlock the column 1/sleeve 2 assembly.

Figure 2:
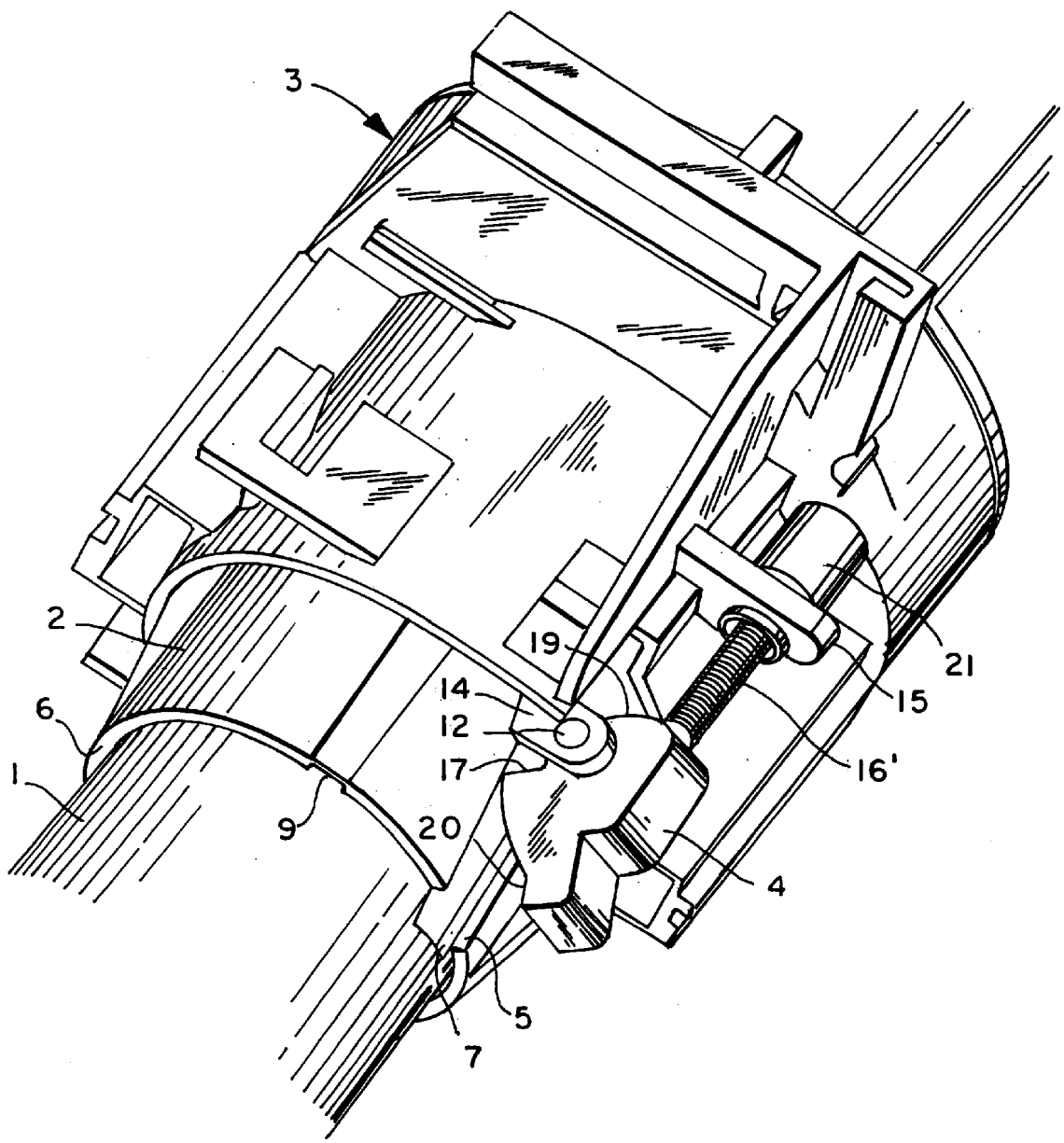
FIG. 2 shows these components again in their assembled form.

FIG. 2 represents one of the two variants in which a locking screw 16' exerts a force against the surface 19. In this case tightening the screw 16' via its head 21, by acting on the surface 19, enables a force to be exerted in the opposite direction via the parallel surface 17 in contact with the orifice 7. Dismantling can be achieved very simply by loosening the screw 16', allowing freedom of rotational movement, albeit restricted, to the latch 4.

Figure 3:
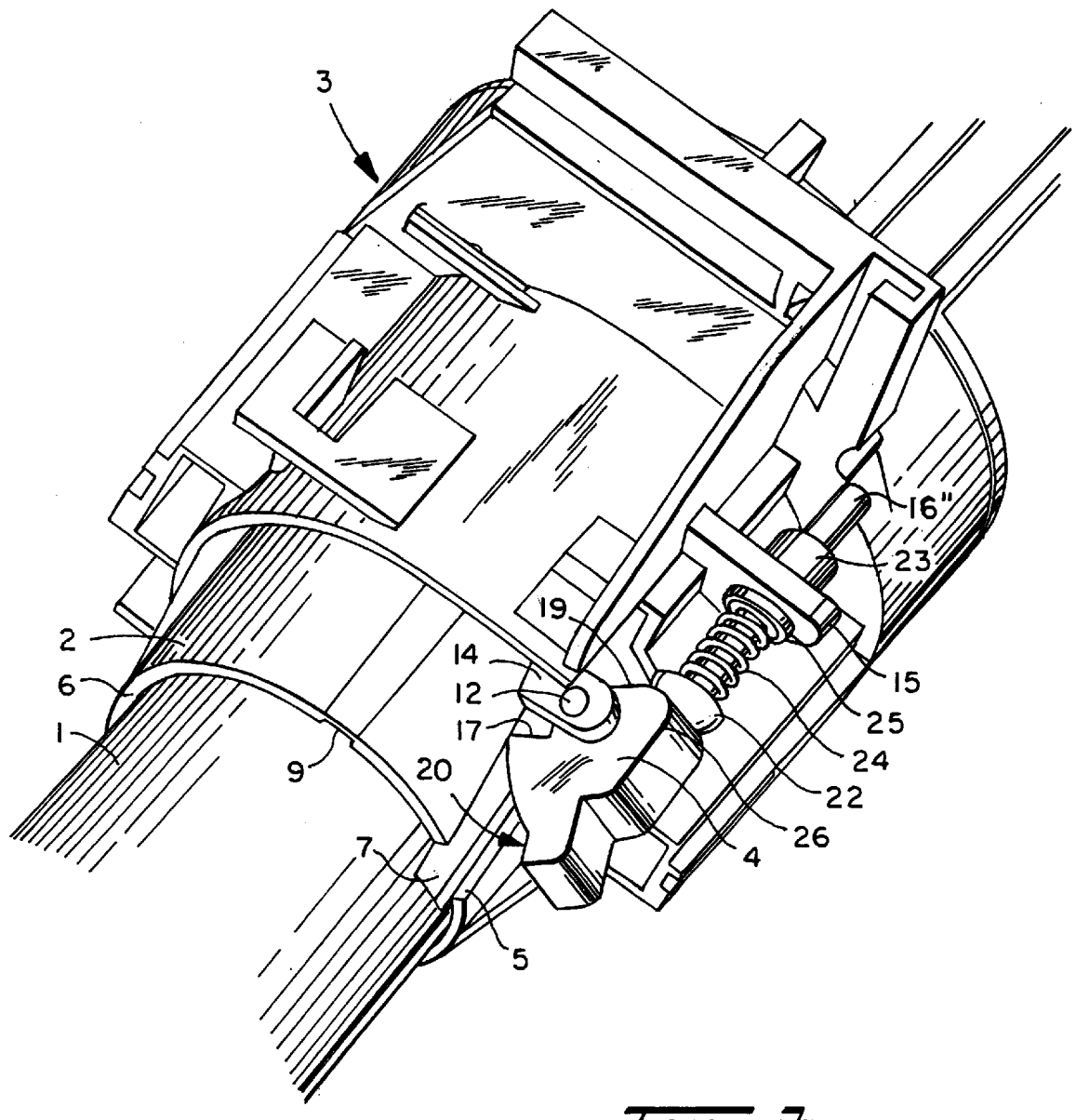
FIG. 3 represents the variant with return device.

In this view, and also in FIG. 3, the latch 4 is shown in the process of pivoting, where the surface 17 is not yet in contact with the upper edge of the orifice 7, and locking is therefore not yet effective.

In FIG. 3, the screw 16' is replaced by rod variant 16" wound with a spring 24 held at both ends respectively by the inside of the bracket 15 and an end piece 22 with a bearing surface. The bracket 15 has a collar 25 serving to guide the spring 24.

Alternatively, this configuration could simply be a screw whose head 22 serves as a contact piece, the body 16" guiding and holding the spring 24 in translation, with translation of the screw being restricted by the nut 23. This letter arrangement also allows adjustment of the possible travel and therefore of the return force exerted.

The action exerted by this device FIG. 3 is the same as that described earlier. To dismantle the upper part of the column, and therefore inhibit the locking, it is necessary simply to exert an outward radial force on the area 20 of latch 4. The cam has a rounded area 26 enabling the spring 24 and the rod 16" to be forced back.

The end piece 22 is also rounded to optimize cooperation with the portion 26 of the latch 4. A simple blade tool enables the latch 4 to be pivoted in order to extract the area 17 from the window 7 of the steering column 1.

The shapes of the various components described above are simply illustrative examples and in no way limit the invention, which on the contrary covers all variants within the scope of skilled persons and comprised within the protective domain of the enclosed claims.

We claim:

1. A system for locking an end of a steering column shaft to a sleeve portion of a steering column comprising:
   (a) a pivot support attached directly to the exterior of said sleeve portion, and first surfaces for rotational locking provided on the interior of said sleeve portion;
   (b) second surfaces for rotational locking provided on one end of said shaft, wherein said one end of said shaft is received in said sleeve portion and said first and second surfaces for rotational locking are inter-engaged for preventing relative rotation between said shaft and sleeve portion;
   (c) a slot formed in said sleeve portion and an aperture formed in said shaft; and,
   (d) a locking member pivoted on said pivot support and pivotally moveable between an unlocked position and a locked position in which a portion thereof is received through said slot and engages said aperture for retaining said shaft in said sleeve.

2. The system defined in claim 1, further comprising orienting means operable for rotationally orienting said shaft with said sleeve portion as said shaft is inserted in said sleeve portion and for facilitating alignment of said slot with said aperture.

3. The system defined in claim 1, wherein said sleeve portion includes a switch mounting bracket.

4. The system defined in claim 1, wherein said first and second surfaces for rotational locking comprise crenellations.

5. The system defined in claim 1, wherein said first and second surfaces for rotational locking comprise castellations.

6. The system defined in claim 1, wherein said first and second surfaces for rotational locking comprise trapezoidal crenellations.

7. The system defined in claim 1, further comprising means operative to urge said locking member to said locked position.

* * * * *